Figure 1:
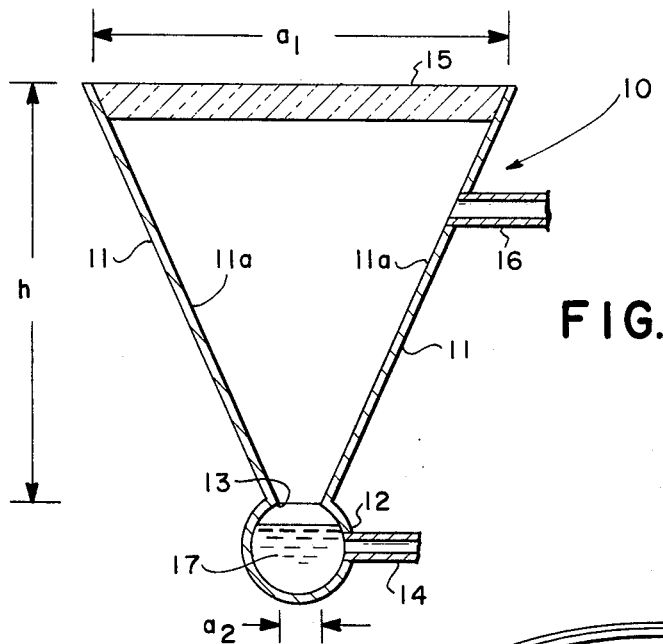

United States Patent [19]

Wyatt et al.

[11] 4,350,915
[45] Sep. 21, 1982

[54] RADIANT ENERGY CONVERTER

[76] Inventors: William G. Wyatt, 8366 Garland Rd., Dallas, Tex. 75218; Jack H. Shaw, 1715 Baylor, Richardson, Tex. 75081

[21] Appl. No.: 892,686

[22] Filed: Apr. 3, 1978

Related U.S. Application Data

[63] Continuation of Ser. No. 727,124, Sep. 27, 1976, abandoned.

[51] Int. Cl.³ .............................................. H01V 45/00
[52] U.S. Cl. ...................................... 310/306; 310/10; 310/11
[58] Field of Search .......................... 310/306, 11, 10

[56] References Cited

U.S. PATENT DOCUMENTS

| | | | |
|---|---|---|---|
| 3,480,806 | 11/1969 | Berberich | 310/11 |
| 3,702,973 | 11/1972 | Daugherty et al. | 310/11 X |
| 3,748,505 | 7/1973 | Lauarini | 310/11 |
| 3,899,696 | 8/1975 | Fletcher | 310/4 |
| 3,923,381 | 12/1975 | Winston | 350/293 |

*Primary Examiner*—Donovan F. Duggan
*Attorney, Agent, or Firm*—Kanz & Timmons

[57] ABSTRACT

Disclosed is a radiant energy converter which directs concentrated radiant energy in a first direction through or to a plane of limited area. An energy absorbing fluid is passed through the plane in the opposite direction so that the concentrated radiant energy is absorbed directly by the fluid. The converter may be used in connection with conventional collectors and concentrators to provide more efficient conversion of radiant energy. Also disclosed is a magnetohydrodynamic generator employing the converter of the invention.

12 Claims, 2 Drawing Figures

RADIANT ENERGY CONVERTER

This application is a continuation of application Ser. No. 727,124, filed 9/27/76, now abandoned.

This invention relates to collection and concentration of electromagnetic radiation and conversion thereof to other forms of useful energy. More particularly, it relates to methods and apparatus for converting concentrated solar energy to thermal energy or electrical energy.

Various schemes have been devised for collecting and concentrating solar energy and converting solar energy to thermal energy for performing useful work. Basically such schemes employ means to direct concentrated sunlight onto a trap containing an energy absorbing fluid such as water. All such prior art proposals, however, are limited because of basic problems inherent in the collection of solar energy. The most difficult problems encountered are energy loss through re-radiation or reflection of radiant energy from the collector, the usual requirement for apparatus for tracking the sun in its apparent daily motion through the celestial sphere, and energy loss by thermal radiation and thermal conduction from the trap.

Various apparatus have been described in the prior art to reduce the adverse effects of these basic problems. However, none of the prior art systems has adequately solved both the problem of energy loss and solar tracking. Frequently, the solution of one problem tends to enlarge the difficulties posed by the other. For example, systems which permit solar concentration by large factors generally require more careful and frequent diurnal adjustments for solar tracking. Conversely, systems which require little or no diurnal adjustment generally provide the lowest factors of concentration.

U.S. Pat. No. 3,923,381 to Winston describes an energy collection system employing a trough-shaped structure with opposed reflective inner surfaces which guide and concentrate radiant energy impinging on the top opening. The reflective walls are opposed symmetrical parabolic curves which define a realtively large entrance and a relatively small exit through which radiant energy is directed.

The collector described in U.S. Pat. No. 3,923,381, however, concentrates and directs radiant energy to a conventional trap. Therefore, while substantially minimizing the need for diurnal tracking and minimizing re-radiation from the collector, the system of Winston does nothing to eliminate re-radiation from the trap and likewise does nothing to assure that the concentrated solar energy is converted to useable energy.

In accordance with the present invention, radiant energy concentrated in a plane across a passageway and traveling in a first direction is absorbed by an energy absorbing fluid which is simultaneously passed through the same passageway in the opposite direction. In this manner the radiant energy concentrated in the exit aperture of a collector is absorbed directly by an energy absorbing fluid, thus avoiding re-radiation and thermal conduction losses from conventional traps. The velocity of the energy absorbing fluid through the exit may be controlled as desired to control the temperature of the heated fluid. The fluid may even be thermally dissociated or ionized and accelerated sufficiently to generate electrical energy directly by magnetohydrodynamics.

The converter of the invention may employ any suitably efficient radiant energy collector such as that shown in U.S. Pat. No. 3,923,381 or any other concentrator wherein radiant energy is directed through or to an exit aperture in the collector and concentrated in a plane of defined dimensions.

Apparatus employing the principles of the invention may be fabricated with inexpensive and readily available commercial materials to produce radiant energy concentrators and converters which require no diurnal tracking but which are sufficiently efficient to economically convert solar energy to commercial uses. The converter may be adapted to produce high temperature or low temperature fluid for use as a thermal source or to drive turbines. Furthermore, the simplicity of design permits ready integration of the converter of this invention into prior art solar energy collection and conversion schemes to greatly increase their efficiency and produce commercially practical solar energy apparatus at reasonable costs.

Figure 2:
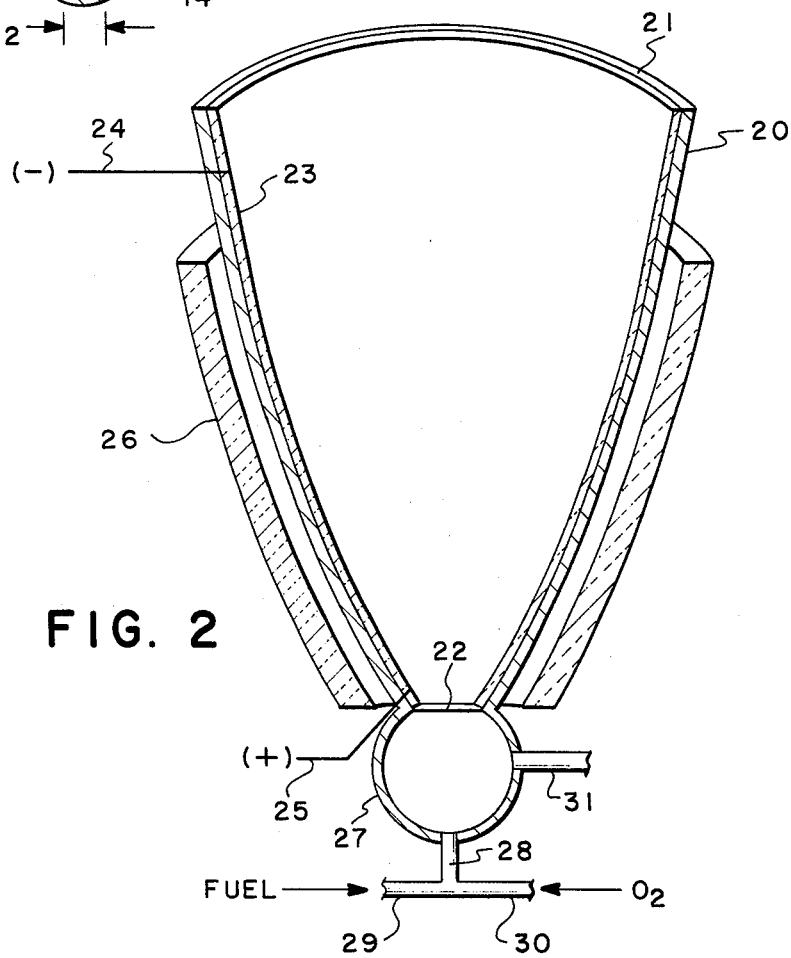

Other features and advantages of the invention will become more readily understood from the following detailed description taken in connection with the appended claims and attached drawings in which:

FIG. 1 is a sectional view of radiant energy concentration and conversion apparatus utilizing the principles of the invention to produce a heated fluid stream, and FIG. 2 is a sectional view of an alternative embodiment of the invention for conversion of radiant energy to electrical energy by magnetohydrodynamics.

The embodiment illustrated in FIG. 1 comprises a generally trough-shaped body 10 having longitudinally extending substantially parallel geometrically similar side walls 11. The inner surfaces 11a of the side walls are highly reflective.

In the embodiment illustrated the reflective sides 11a are flat and define an entrance aperture $a_1$ and exit aperture $a_2$. The height of the device will, of course, be determined by the geometry of the device and the purpose for which it is intended. As is well known, the concentration ratio of a concentrator as generally illustrated in FIG. 1 is determined by the area of the entrance aperture $a_1$ divided by the area of the exit aperture $a_2$. Ordinarily, as discussed in the Winston U.S. Pat. No. 3,923,381, the concentration ratio of collectors of the type shown is dependent on the angle of capture. As used herein, the angle of capture is intended to mean the included angle from the vertical in which radiation which passes through the entrance aperture will be directed through the exit aperture either directly or indirectly through one or more reflections. When the sides 11 are parallel, the angle of capture is 90°. However, the concentration ratio is unity. As the sides 11 are formed into a trough, the concentration ratio increases but the angle of capture is reduced.

Various shapes of collectors, including that shown by Winston, have been devised to provide the highest concentration ratio consistent with acceptable angles of capture. For purposes of the present invention, any suitable collector which directs concentrated radiant energy in a first direction through a plane of limited area may be used. For simplicity of illustration, the sides 11 of the collector of FIG. 1 are shown as flat surfaces. It will thus be observed that radiation entering the entrance aperture of the device of FIG. 1 within the angle of capture will be directed through the exit aperture $a_2$, the amount of concentration depending on the areas $a_1$ and $a_2$.

It will be apparent that the apparatus illustrated is a non-imaging collector and incident radiant energy is concentrated to a plane which lies in the exit aperture and is perpendicular to the axis of symmetry of the collector. Therefore, the radiant energy is moving in a direction from the entrance aperture to the exit aperture generally perpendicularly to the plane in which the radiation is concentrated.

In the embodiment illustrated in FIG. 1, a cylindrical conduit 12 having an axial opening 13 coincident with and bridging the exit aperture $a_2$ of the collector is mated with the sides 11. The conduit 12 is provided with an inlet 14.

The entrance aperture of the collector is enclosed with a transparent window 15, such as glass or the like, to permit radiant energy to enter the collector body 10. The collector body 10 enclosed by window 15 and conduit 12 as illustrated forms an enclosed trough-shaped body with an inlet 14 and an outlet 16.

It will be observed that radiant energy impinging on the window 15 within the angle of capture will either pass directly through the plane of the exit aperture $a_2$ or be reflected from the sides 11a to the exit aperture $a_2$. The radiant energy is thus concentrated in the plane of the exit aperture.

An energy absorbing fluid 17 is introduced through inlet 14. The fluid 17 may either be liquid or gas. In the simplest form the fluid may be water which partially fills the conduit 12 as illustrated in FIG. 1.

Radiant energy passing through the exit aperture $a_2$ is aborbed by the fluid 17. Since the radiant energy is concentrated in the plane of the exit aperture $a_2$, gaseous fluid (vaporized from the liquid 17 or injected directly into the inlet 14) passing upwardly through the exit aperture $a_2$ passes through the plane of concentrated radiant energy in the direction opposite to the direction of the radiant energy. The radiant energy is thus partially absorbed by the fluid in the plane of the exit aperture and rapidly heated. The heated fluid then exits the converter through outlet 16.

The energy absorbed by the fluid will depend, of course, on known variables such as size and concentration ratio of the collector, the absorptivity of the fluid and the like.

It will be readily appreciated that in the simple system illustrated in FIG. 1 using water as the absorption fluid, the temperature of the exiting steam may be controlled by controlling the pressure of the gas. As a practical matter, however, pressure control of the vapor in the collector may be somewhat limited because of the materials used for the window 15. Because of the large area of window 15, extremely high pressures cannot be practically accommodated. However, absorption of energy in the gas passing through the exit aperture $a_2$ can be controlled by controlling the pressure of the fluid in the exit aperture $a_2$. For this purpose the area of the exit aperture may be designed to maintain a pressure differential thereacross. For example, the size of the conduit 12 may be relatively large and the internal surface thereof coated or otherwise adapted to be highly absorptive. Accordingly, the fluid therein will be heated as radiant energy is trapped by the conduit 12 and transferred to the fluid. The vaporized fluid is further heated as it passes through the exit aperture. To provide higher temperatures the internal surface of the conduit 12 may be made highly reflective. Thus radiant energy entering the conduit 12 through exit aperture $a_2$ is reflected from the reflective walls of the conduit until absorbed by the fluid therein. If the area of the exit aperture $a_2$ is suitably controlled, the fluid in the conduit 12 will be vaporized and the pressure inside conduit 12 will increase. The high pressure gas will then be subjected to the highest cncentration of radiant energy as it passes through the exit aperture as described above. However, since the exit aperture is relatively small, the gas will be under pressure and relatively dense as it passes through the plane of concentrated radiant energy and thus absorption efficiency is increased to produce a higher temperature exiting gas.

It will be appreciated that the gas contained within the walls 11 of the concentrator will be subjected to radiant energy as the radiant energy is reflected through the concentrator. However, energy absorption occurs primarily at the exit aperture $a_2$ since the radiant energy is concentrated in this plane.

The window 15 need not necessarily be placed at the entrance aperture. If desired, the window may be placed at any point between the entrance and exit apertures or may be omitted. In relatively low temperature applications, the heated vapor may tend to condense on the cooler portions of the collector such as near the entrance aperture or on the inside face of the window 15. Condensate on the walls of the concentrator or the window 15 may substantially alter the optical characteristics of the collector and cause undesirable reflection and re-radiation. To prevent such re-radiation, the window 15 may be placed in the higher temperature regions of the concentrator or, alternatively, a second window placed between the entrance aperture and the outlet 16. The position of the outlet 16, however, may be positioned wherever desired between the exit aperture $a_2$ and the window closest to the exit aperture $a_2$.

From the foregoing it will be appreciated that in accordance with the invention radiant energy is concentrated as it travels in a first direction substantially normal to the plane of the exit aperture of the concentrator. Maximum concentration occurs, therefore, in the plane of the exit aperture. The energy absorbing fluid also passes through the exit aperture of the concentrator. However, the fluid flows in a second direction substantially normal to the plane of the exit aperture and opposite to the direction of travel of the concentrated energy. Thus the fluid is exposed to the concentrated energy at the point of maximum concentration. Furthermore, the concentrated energy is absorbed directly by the fluid flowing through the exit aperture, not by a trap or other collection means which must then transfer the energy to a fluid. Since the trap is totally eliminated, reradiation by reflection from the trap and thermal radiation from the trap, as well as thermal loss by absorption and thermal conduction by the trap to heat sinks other than the energy absorbing fluid, is likewise eliminated.

As noted above, any suitably efficient collector which concentrates radiant energy traveling in a first direction in a plane substantially normal to the direction of travel of the radiant energy can be adapted to convert such radiant energy in accordance with the invention. The concentrator may be a V-shaped trough as shown in FIG. 1, a parabolic trough as shown by Winston, a cone or any other similar concentrator.

The energy absorbed by the fluid passing through the converter described may be used in various conventional ways, such as to drive turbines or heat other materials through heat exchangers or the like. Obviously, the energy absorbing fluid may be recycled through the converter in conventional manner.

Conventional concentrating collectors are known to provide concentrations as high as 100 to 1000. Accordingly, utilizing the principles of the invention, a wide range of temperatures and pressures of heated fluids may be produced. Because of the high efficiency of absorption of radiant energy in the converter of the invention, however, using collectors with concentration ratios on the order of 10,000, temperatures on the order of 3000° F. may be obtained in the plane of the exit aperture. For example, a concentration ratio of 10,000 could be attained by a field of mirrors reflecting to a reflector based on a tower with the tower based reflector reflecting the solar energy to a parabolic cone such as shown in the Winston patent. At those temperatures some gases, such as potassium-seeded water, may be partially ionized and charged particles from the ionized stream collected to produce electrical current.

Apparatus for producing electrical energy by the magnetohydrodynamic phenomenon is illustrated in FIG. 2. The embodiment illustrated includes a parabolic cone 20 for use as a collector and concentrator of radiant energy. As pointed out above, various collectors known in the art may be used to direct concentrated radiant energy into the cone 20.

The cone 20 has an entrance aperture 21 through which radiant energy is collected and directed toward the exit aperture 22. A portion of the internal surface of the cone 20 is coated with an electrically conductive and highly reflective coating 23. The parabolic cone 20 may be any suitable solar collector and concentrator which achieves concentration ratios in the range of 10,000. As explained hereinabove, the radiant energy impinging on the cone within the angle of capture of the entrance aperture 21 is concentrated in the plane of the exit aperture 22. An electrically conductive lead 24 is electrically connected to the conductive coating 23 near the entrance aperture. A second electrically conductive lead 25 is electrically connected to the electrically conductive coating 23 near the exit aperture 22.

The cone 20 is at least partially surrounded by a magnet 26. As is well known in the art, when ionized or partially ionized gas passes through a magnetic field, the charged particles will be deflected and may be collected on an appropriately positioned conductor to produce electrical energy by the phenomenon known as magnetohydrodynamics. In accordance with the invention, an ionized or partially ionized gas passes axially through the cone 20 and electrons or negatively charged particles are deflected from the ionized stream by the magnet and collected on the electrically conductive coating 23, thus developing voltage across leads 24 and 25. An ionized or partially ionized fluid stream is formed by injecting an ionizable fluid, such as potassium-seeded water vapor, through the exit aperture 22 where it is heated and ionized or partially ionized by the radiant energy concentrated therein by the collector and concentrator cone 20. The magnet 26 surrounding the cone 20 deflects negatively charged particles or electrons from the ionized fluid stream which are then collected on the conductive coating 23, thus generating a voltage across the conductive leads 24 and 25.

If desired, the entrance aperture of the collector 20 may be enclosed with a suitable window and the heated gas stream vented from the collector through a suitable exit (not shown) for further use as a heat source or power source to drive a turbine or the like. The heated fluid stream may, of course, be recycled through the generator by conventional means or salts contained therein may be separated out and the water vapor condensed as a fresh water supply. Also the magnetohydrodynamic electrical generation equipment may be located around the ionized gas stream after it has exited the conical section.

In the embodiment illustrated, the ionizable fluid is injected into the concentrator by means of an inlet 31 which communicates with a hollow spherical bulb 27 which in turn has an opening communicating with exit aperture 22. The ionizable fluid may be preheated by means of a heat exchanger drawing thermal energy from the exiting gas. If desired, the inlet line may be formed concentrically with the outer walls of the concentrator cone whereby the incoming ionizable fluid acts to cool the walls of the concentrator. Various other arrangements will be readily apparent to those skilled in the art.

As illustrated in FIG. 2, the magnetohydrodynamic generator of the invention as described above may be supplemented by the reaction of fuels to produce ionized gas in a more conventional manner. For example, a hydrocarbon fuel and oxygen may be injected into a combustion nozzle 28 by means of inlets 29 and 30, respectively. By combustion of the fuel in the nozzle 28 and bulb 27 an ionized gas is formed which passes through the exit aperture 22. Thus, the hydrocarbon combustion process for forming an ionized fluid may be used to supplement the energy concentrated by the collector 20 or provide the total needs of the collector when sufficient radiant energy is not available. Likewise, the concentrator collector 20 may be used to provide concentrated radiant energy to supplement energy produced by hydrocarbon combustion. Various other arrangements employing the radiant energy converter of the invention in combination with other magnetohydrodynamic generators will be apparent to those skilled in the art.

It will be readily recognized that the heated fluid exiting from radiant energy converter of the invention may be used in various conventional processes, such as for distillation or desalinization processes and the like. It is to be understood therefore, that although the invention has been described with particular reference to specific embodiments thereof, the forms of the invention shown and described in detail are to be taken as preferred embodiments thereof, and that various changes and modifications may be resorted to without departing from the spirit and scope of the invention as defined by the appended claims.

What is claimed:

1. A radiant energy converter comprising
   (a) means for collecting and concentrating radiant energy, said means comprising a hollow body with divergent reflective sides defining an entrance aperture and an exit aperture of limited area and adapted to collect and concentrate radiant energy and direct the concentrated radiant energy in a first direction through said exit aperture of limited area, and
   (b) means for passing a fluid through said exit aperture in substantially the opposite direction whereby said radiant energy is at least partially absorbed by said fluid passing through said exit aperture.

2. A radiant energy converter as defined in claim 1 wherein said means for collecting and concentrating radiant energy comprises a collector having geometrically similar opposed divergent sides defining said entrance aperture and exit aperture.

3. A radiant energy converter as defined in claim 2 including a window between said entrance aperture and said exit aperture substantially transparent at the wavelengths of said radiant energy.

4. A radiant energy converter as defined in claim 2 wherein said means for passing a fluid through said exit aperture is conduit means bridging said exit aperture.

5. A radiant energy converter as defined in claim 4 wherein the internal surface of said conduit is substantially cylindrical and reflective.

6. A radiant energy converter as defined in claim 4 wherein the internal surface of said conduit is spherical and reflective.

7. The method of absorbing radiant energy in a fluid comprising the steps of
   (a) collecting and concentrating radiant energy in a collector defined by opposed sides defining an entrance aperture and an exit aperture of limited area and directing said concentrated radiant energy in a first direction through said exit aperture of limited area, and
   (b) directing an energy absorbing fluid through said exit aperture in substantially the opposite direction.

8. The method set forth in claim 7 wherein said fluid is a gas and the area of said exit aperture is limited to control the pressure of the gas passing therethrough.

9. The method set forth in claim 7 wherein said fluid is disposed in a conduit below said exit aperture and vaporized by radiant energy passing through said exit aperture and the gas vaporized from said fluid is passed through said exit aperture.

10. The method of generating an electrical current in an electrically conductive means comprising the steps of
    (a) disposing said electrically conductive means within a radiant energy collector having an entrance aperture and an exit aperture,
    (b) collecting radiant energy through said entrance aperture and concentrating said radiant energy in the plane of said exit aperture,
    (c) disposing said radiant energy collector in a magnetic field, and
    (d) injecting an ionizable fluid into said radiant energy collector through said exit aperture.

11. The method set forth in claim 10 wherein said ionizable fluid includes ionized particles produced by combution of a hydrocarbon fuel.

12. The method set forth in claim 10 wherein said fluid is injected into an inlet communicating with said exit aperture and at least partially heated in said inlet by radiant energy passing through said plane.

* * * * *